(No Model.)

C. WÜNSCH.
ICE VELOCIPEDE.

No. 311,862. Patented Feb. 3, 1885.

WITNESSES:
A. P. Grant
W. F. Kircher

INVENTOR:
Christian Wünsch
BY John A. Wiederstein
ATTORNEY.

UNITED STATES PATENT OFFICE.

CHRISTIAN WÜNSCH, OF CAMDEN, NEW JERSEY.

ICE-VELOCIPEDE.

SPECIFICATION forming part of Letters Patent No. 311,862, dated February 3, 1885.

Application filed September 12, 1884. (No model.)

*To all whom it may concern:*

Be it known that I, CHRISTIAN WÜNSCH, a citizen of the United States, residing in the city and county of Camden, State of New Jersey, have invented a new and useful Improvement in Ice Velocipedes and Sleds, which improvement is fully set forth in the following specification and accompanying drawings, in which—

Figure 1:
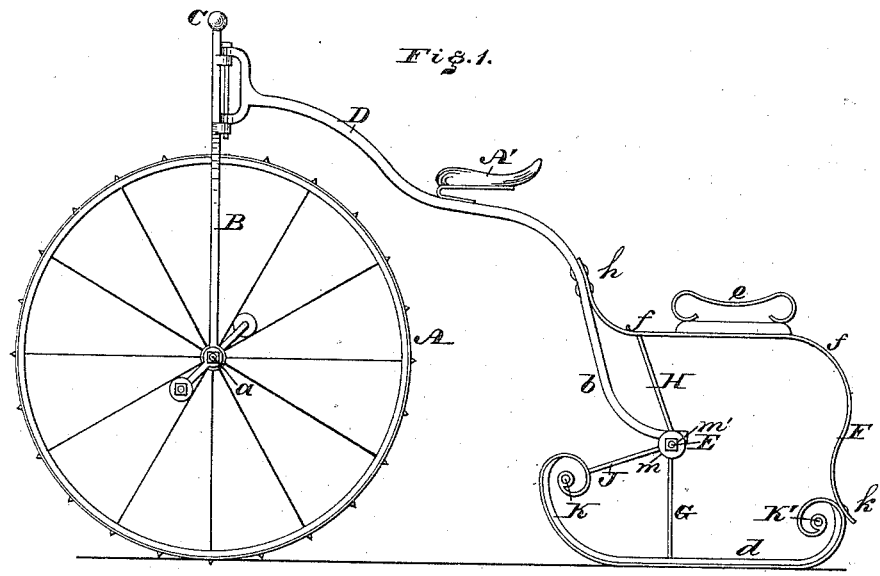
Figure 2:
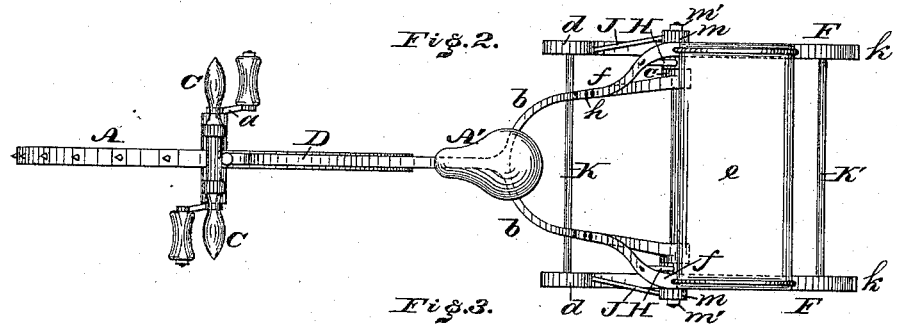
Figure 3:
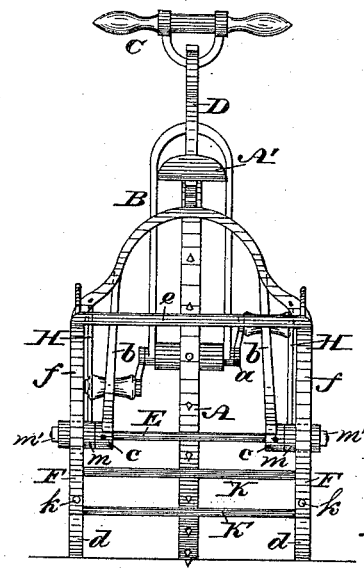

Figure 1 represents a side elevation of a velocipede and sled embodying my invention. Fig. 2 represents a top or plan view thereof. Fig. 3 represents a rear view thereof.

Similar letters of reference indicate corresponding parts in the several figures.

My invention consists of a combined ice velocipede and sled, as will be hereinafter fully set forth.

Referring to the drawings, A represents a wheel which is mounted on the forks B by means of the crank or treadle shaft $a$, the upper ends of the forks being provided with handles or tillers C, and pivoted or hinged to the backbone or reach D, all as usual in velocipedes. The rear end of the reach is bifurcated, the forks $b\ b$ thereof having eyes or bosses $c$, which are connected with a shaft, E, with which is also connected a sled, F, of which $d$ represents the runners, $e$ the seat, and $f$ the seat-frame. The runners are connected with the shaft E by means of vertical supports or braces G, and the seat-frame is riveted or bolted in front to the forks $b$ of the backbone, as at $h$, and at rear to the rear ends of the runner, as at $k$. From the shaft E rise braces H, whose upper ends are secured to the seat-frame $f$. Braces J also extend from the shaft E to the front of the runners $d$, it being noticed that the braces G H J are secured to bosses or hubs $m$, which are fitted on the shaft E.

K K' represent rounds, respectively at the front and rear of the runners, for connecting and strengthening the same, and forming rests for the feet, it being noticed that the rider of the sled is permitted to occupy the seat $e$ and face to the front or rear, as desired. The bosses $c$ are secured to the rod or shaft E in any suitable manner, and the hubs $m$ tightened against said bosses by nuts $m'$, thus rigidly connecting said shaft with the contiguous parts. The wheel A has studs or spurs on the periphery thereof, so that it may take hold of ice, and when it is operated by the rider, who occupies the seat A', the velocipede and sled are both propelled, it being evident that the sled prevents overturning of the velocipede portion of the conveyance. It will also be seen that the sled is light, strong, and durable, and the combination of the velocipede and sled produces an interesting device.

Having thus described my invention, what I claim as new, and desire to secure by Letters Patent, is—

1. A velocipede in combination with a sled, the shaft connecting the runners of the latter passing through bosses formed on the bifurcated end of the reach or backbone of the former, substantially as and for the purpose set forth.

2. A velocipede in combination with a sled formed of runners, a seat-frame secured at the rear end to the rear ends of the runners and at the front end to the reach, said runners being connected by shafts and rods, substantially as and for the purpose set forth.

3. A velocipede in combination with a sled formed of runners connected by a shaft to which is pivotally secured the bifurcated arm of the reach or backbone of the velocipede, said sled having a seat-frame directly over the runners and secured thereto at their rear ends and to the reach and provided with braces extending from the said shaft to both runners and seat-frame, substantially as and for the purpose set forth.

4. A velocipede in combination with a sled having a rod, E, braces G H, bosses $m$ and nuts $m'$, for connecting the runners and seat-frame of the sled, the reach of the velocipede being also connected with said rod, substantially as and for the purpose set forth.

CHRISTIAN WÜNSCH.

Witnesses:
JOHN A. WIEDERSHEIM,
A. P. GRANT.